United States Patent
Takatsuka

(10) Patent No.: US 8,016,673 B2
(45) Date of Patent: Sep. 13, 2011

(54) GAME DEVICE, GAME DEVICE CONTROL METHOD, AND INFORMATION STORAGE MEDIUM

(75) Inventor: Shingo Takatsuka, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 986 days.

(21) Appl. No.: 11/795,236

(22) PCT Filed: Dec. 19, 2005

(86) PCT No.: PCT/JP2005/023297
§ 371 (c)(1),
(2), (4) Date: Jul. 13, 2007

(87) PCT Pub. No.: WO2006/080162
PCT Pub. Date: Aug. 3, 2006

(65) Prior Publication Data
US 2008/0085767 A1    Apr. 10, 2008

(30) Foreign Application Priority Data
Jan. 31, 2005   (JP) .................................. 2005-022715

(51) Int. Cl.
*A63F 13/00* (2006.01)
(52) U.S. Cl. ........................................................ 463/32
(58) Field of Classification Search ....................... 463/32
See application file for complete search history.

(56) References Cited

U.S. PATENT DOCUMENTS 5,833,549 A * 11/1998 Zur et al. ..................... 473/199
6,149,520 A    11/2000 Takatsuka

FOREIGN PATENT DOCUMENTS

| EP | 0778547 A1 | 6/1997 |
| JP | 10-113471 A | 5/1998 |
| JP | 10113471 A | 5/1998 |
| JP | 11-90046 A | 4/1999 |
| JP | 3145064 B2 | 1/2001 |
| JP | 2002-92635 A | 3/2002 |
| JP | 11090046 A | 12/2004 |

OTHER PUBLICATIONS

Japanese Office Action dated Aug. 29, 2008.
European Search Report dated Jul. 8, 2008.

* cited by examiner

*Primary Examiner* — Melba Bumgarner
*Assistant Examiner* — Thomas H Henry
(74) *Attorney, Agent, or Firm* — Sughrue Mion, PLLC

(57) ABSTRACT

To provide a game device for allowing a game player to relatively readily control an operation target player character object so as to make a motion according to a moving speed of the moving body object. The present invention relates to a game device for displaying an image obtained by viewing, from a predetermined viewpoint, a virtual three-dimensional space where an operation target player character object and a moving body object representative of a moving body are disposed, and providing a sports game using the moving body. An object control unit (74) controls an operation target player character object so as to change the position and posture thereof in accordance with a moving speed of the moving body object according to a result of determination as to whether or not the positions of the operation target player character object and the moving body object satisfy a predetermined position condition.

10 Claims, 8 Drawing Sheets

| MOTION DATA 1 | TURN MOTION WITHOUT TRAP MOTION |
|---|---|
| MOTION DATA 2 | TURN MOTION WITH TRAP MOTION |

| A | $0 \leqq v < V1$ | MOTION DATA 1 |
|---|---|---|
| B | $V1 \leqq v$ | MOTION DATA 2 |

GAME DEVICE, GAME DEVICE CONTROL METHOD, AND INFORMATION STORAGE MEDIUM

TECHNICAL FIELD

The present invention relates to a game device, a control method for the game device, and an information storage medium.

BACKGROUND ART

There is known a game device for showing an image of a picture obtained by viewing, from a predetermined viewpoint, a virtual three-dimensional space where an operation target player character object and a moving body object representative of a moving body are disposed, and providing a sports game using a moving body. In the above, the operation target player character object changes the position and posture thereof according to an operation signal from an operation unit. For example, Japanese Patent No. 3145064 discloses a game device for providing various ball sports games, such as a soccer game, a basketball game, and so forth, which use a ball.

DISCLOSURE OF THE INVENTION

Problems to be Solved by the Invention

In the above-described game device, the game player may wish to control the operation target player character object so as to make a motion in accordance with the moving speed of the moving body object. For example, in a soccer game, when a ball object is passed and is moving towards the operation target player character object at a speed faster than the speed at which the operation target player character object can move, the operation target player character object is controlled to trap the ball object. Meanwhile, when the moving object of the ball object moves substantially as fast as the moving operation target player character object, the game player may wish to keep the ball object moving as it is, rather than being trapped by the operation target player character object, so as to make a quick attack.

In the above, however, the game player cannot readily know the moving speed of the moving body object, and thus cannot control the operation target player character object so as to act in a desired manner according to the moving speed of the moving body object.

The present invention has been conceived in view of the above, and aims to provide a game device, a game device control method, and an information storage medium for enabling the game player to relatively readily control the operation target player character object so as to make a motion according to the moving speed of the moving body object.

Means for Solving the Problem

In order to achieve the above object, according to one aspect of the present invention, there is provided a game device for displaying an image of a picture obtained by viewing, from a predetermined viewpoint, a virtual three-dimensional space in which an operation target player character object which changes a position and posture thereof according to an operation signal input from operation means and a moving body object representative of a moving body are disposed, and providing a sports game using the moving body, the game device comprising position condition determination means for determining whether or not a position of the operation target player character object and a position of the moving body object in the virtual three-dimensional space satisfy a predetermined position condition; and object control means for causing the operation target player character object to change the position and posture thereof in the virtual three-dimensional space in accordance with a moving speed of the moving body object in the virtual three-dimensional space, according to a result of determination made by the position condition determination means, when a predetermined operation signal is input from the operation means.

According to another aspect of the present invention, there is provided a method for controlling a game device for displaying an image of a picture obtained by viewing, from a predetermined viewpoint, a virtual three-dimensional space where an operation target player character object which changes a position and posture thereof according to an operation signal input from operation means and a moving body object representative of a moving body are disposed, and providing a sports game using the moving body, the method comprising a position condition determination step of determining whether or not a position of the operation target player character object and a position of the moving body object in the virtual three-dimensional space satisfy a predetermined position condition; and an object control step of causing the operation target player character object to change the position and posture thereof in the virtual three-dimensional space in accordance with a moving speed of the moving body object in the virtual three-dimensional space, according to a result of determination made at the position condition determination step, when a predetermined operation signal is input from the operation means.

According to still another aspect of the present invention, there is provided a program for causing a computer, including, for example, a consumer game machine, a commercial game machine, a portable game machine, a portable telephone, a personal computer, a server computer, or the like, to function as a game device providing a sports game using the moving body, and also to function as means for displaying an image of a picture obtained by viewing, from a predetermined viewpoint, a virtual three-dimensional space where an operation target player character object which changes a position and posture thereof according to an operation signal input from operation means and a moving body object representative of a moving body are disposed; position condition determination means for determining whether or not a position of the operation target player character object and a position of the moving body object in the virtual three-dimensional space satisfy a predetermined position condition; and object control means for causing the operation target player character object to change the position and posture thereof in the virtual three-dimensional space in accordance with a moving speed of the moving body object in the virtual three-dimensional space, according to a result of determination made by the position condition determination means, when a predetermined operation signal is input from the operation means.

According to yet another aspect of the present invention, there is provided a computer readable information storage medium storing the above-described program.

The program distribution device according to the present invention is a program distribution device which comprises an information storage medium storing the above program, reads the program from the information storage medium, and distributes the read program.

The program distribution method according to the present invention is a program distribution method, while using an information storage medium storing the above program, for reading the program from the information storage medium, and distributing the read program.

The present invention relates to a game device for displaying an image of a scene obtained by viewing, from a predetermined viewpoint, a virtual three-dimensional space where an operation target player character object which changes a position and posture thereof according to an operation signal input from operation means and a moving body object representative of a moving body are disposed, and providing a sports game using the moving body.

According to the present invention, when a predetermined operation signal is input from the operation means, according to a result of determination as to whether or not the positions of the operation target player character object and the moving body object in the virtual three-dimensional space satisfy a predetermined position condition, the operation target player character object is caused to change the position and posture thereof in the virtual three-dimensional space, in accordance with the moving speed of the moving body object. According to the present invention, the player can relatively readily control the operation target player character object to make a motion in accordance with the moving speed of the moving body object.

In one example of the present invention, the object control means may include means for acquiring moving speed data indicating the moving speed of the moving body object in the virtual three-dimensional space, means for determining to which of a plurality of speed ranges the moving speed indicated by the moving speed data belongs, and storage means for storing motion data about the operation target player character object in association with each of the plurality of speed ranges, wherein the position and posture of the operation target player character object in the virtual three-dimensional space are changed based on the motion data stored in the storage means in association with the speed range to which the moving speed indicated by the moving speed data belongs.

In the above, the object control means may further include means for changing a trajectory of the moving body object in the virtual three-dimensional space, when the moving speed indicated by the moving speed data belongs to a specific speed range among the plurality of speed ranges.

In another example of the present invention, at least one opponent player character object which opposes the operation target player character object may be disposed in the virtual three-dimensional space, the object control means may include means for determining whether or not the opponent player character object is located in a focused area in the virtual three-dimensional space based on a position of the operation target player character object and a moving direction of the moving body object, and means for changing a trajectory of the moving body object in the virtual three-dimensional space, when it is determined that the opponent player character object is located in the focused area.

In still another example of the present invention, the predetermined operation signal may be an operation signal corresponding to a direction designation operation, the object control means may include means for acquiring designated direction data indicating a direction corresponding to the direction designation operation in the virtual three-dimensional space, means for acquiring moving direction data indicating a moving direction of the moving body object in the virtual three-dimensional space, and angle condition determination means for determining whether or not an angle formed by a direction indicated by the designated direction data and a direction indicated by the moving direction data satisfies a predetermined angle condition, wherein according to results of determinations made by the position condition determination means and the angle condition determination means, the position and posture of the operation target player character object in the virtual three-dimensional space may be changed.

In yet another example of the present invention, the game may be a ball sport game, and the moving body object may be a ball object.

BEST MODE FOR CARRYING OUT THE INVENTION

In the following, one example of an embodiment of the present invention will be described based on the accompanying drawings.

Figure 1:
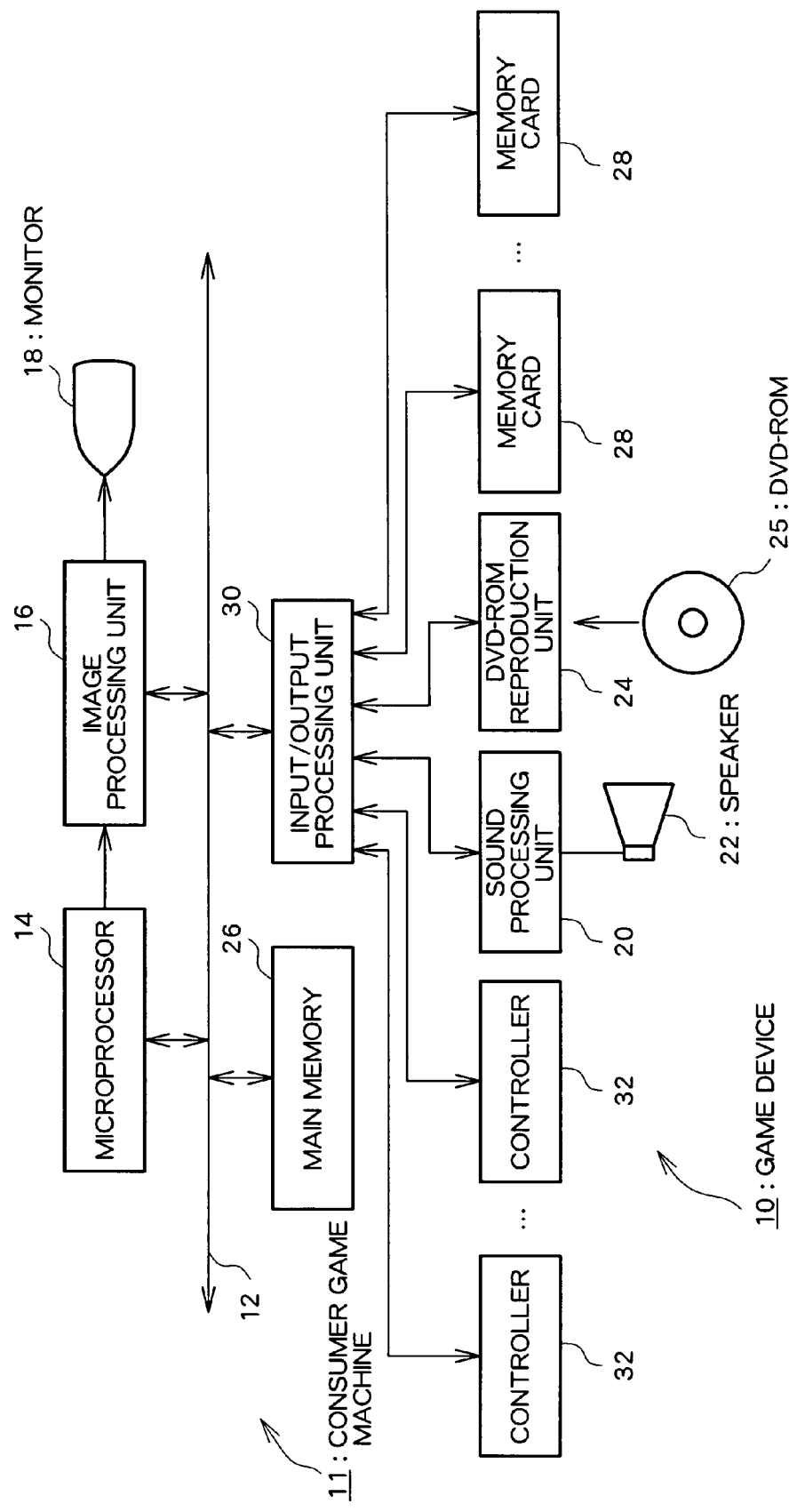
FIG. 1 is a diagram showing a hardware structure of a game device according to the embodiment.

FIG. 1 is a diagram showing a hardware structure of a game device according to an embodiment of the present invention. The shown game device 10 comprises a consumer game machine 11 having a DVD-ROM 25 and a memory card 28, or information storage media, mounted thereto, and a monitor 18 and a speaker 22 connected thereto. For example, the monitor 18 may be a home-use television set receiver and the speaker 22 may be a built-in speaker thereof.

The consumer game machine 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging addresses and/or data among the respective units of the consumer game machine 11. The microprocessor 14, the image processing unit 16, the main memory 26, and the input/output processing unit 30 are mutually connected via the bus 12 for data communication.

The microprocessor 14 controls the respective units of the consumer game machine 11 based on an operation system stored in a ROM (not shown), a program read from the DVD-ROM 25, and data read from the memory card 28. The main memory 26 comprises a RAM, for example, into which a program read from the DVD-ROM 25 or data read from the memory card 28 is written when required. The main memory 26 serves also as a working memory of the microprocessor 14.

The image processing unit 16, comprising a VRAM, receives image data from the microprocessor 14, and renders a game screen image into the VRAM based on the received mage data. Also, the image processing unit 16 converts the content of the rendered game screen image into a video signal, and outputs the video signal to the monitor 18 at a predetermined timing.

The input/output processing unit 30 is an interface via which the microprocessor 14 accesses the sound processing unit 20, the DVD-ROM reproduction unit 24, the memory card 28, and the controller 32. The sound processing unit 20, the DVD-ROM reproduction unit 24, the memory card 28, and the controller 32 are connected to the input/output processing unit 30.

The sound processing unit 20 comprises a sound buffer, and reproduces and outputs, via the speaker 22, various sound data, such as game music, game sound effects, messages, and so forth, read from the DVD-ROM 25 and stored in the sound buffer.

The DVD-ROM reproduction unit 24 reads a program from the DVD-ROM 25 according to an instruction from the microprocessor 14. It should be noted that the DVD-ROM 25 is used here to provide a program to the consumer game machine 11, although any other information storage media, such as a CD-ROM, a ROM card, or the like, may be employed. Alternatively, the program may be provided via a data communication network, such as the Internet, or the like, from a remote place to the consumer game machine 11.

The memory card 28 comprises a nonvolatile memory (for example, EEPROM, or the like). The consumer game machine 11 has a plurality of memory card slots defined therein for each accepting a memory card 28, so that a plurality of memory cards 28 can be inserted into the consumer game machine 11 at the same time. The memory card 28 can be removed from or inserted into the slot. The memory card 28 stores various game data, such as saved data, or the like.

The controller 32 serves as a general purpose operation input means via which the game player inputs various game operations. The input/output processing unit 30 scans the states of the respective units of the controller 32 in a constant cycle (for example, every ⅟₆₀ seconds), and sends an operation signal about the scanning result to the microprocessor 14 via the bus 12. The microprocessor 14 determines the game operation carried out by the game player, based on the operation signal. The consumer game machine 11 is adapted to connection to a plurality of controllers 32, so that the microprocessor 14 controls a game based on the operation signals input from the respective controllers 32.

Figure 2:
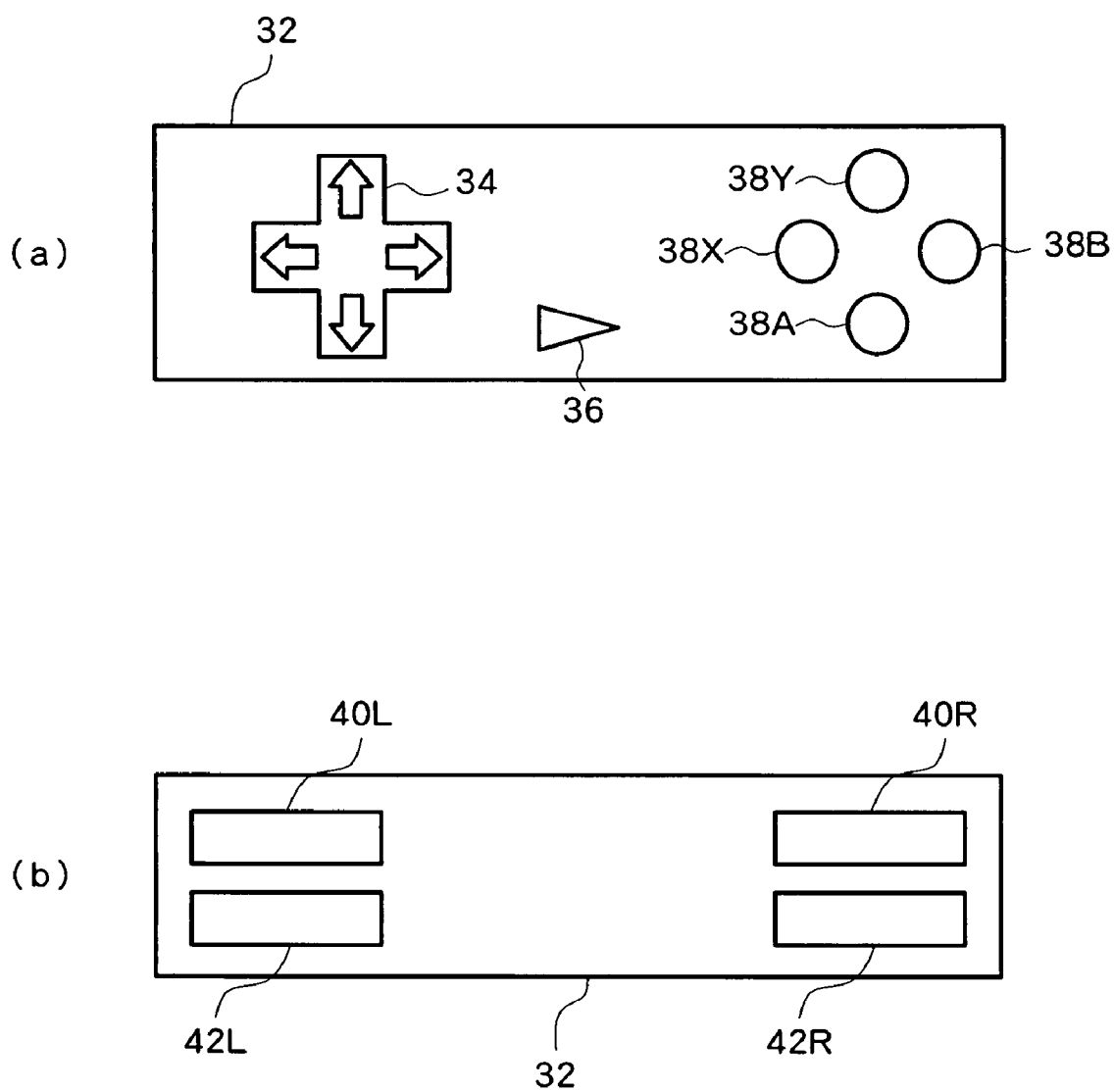
FIG. 2 is a diagram showing an example controller.

FIG. 2 shows one example of the controller 32. The shown controller 32 is a general purpose game controller. As shown in FIG. 2A, the controller 32 has a direction button 34, a start button 36, and buttons 38X, 38Y, 38A, 38B, all formed on the front surface thereof, and also, as shown in FIG. 2B, the buttons 42L, 42R, formed on the top surface on the left and right sides thereof closer to the front surface, and the buttons 40L, 40R, similarly formed but closer to the rear surface. The direction key 34 has a cross shape, and is generally used to designate a direction in which to move the character and/or cursor. The start key 36 is a small triangle press button, and is generally used to start and/or forcibly end the game. The buttons 38X, 38Y, 38A, 38B, 40L, 40R, 42L, 42R are used for other game operations.

With the game device 10 having the above-described hardware structure, a computer program for a soccer game is read from the DVD-ROM 25, and according to the program, a plurality of player character objects (an object representative of a soccer player) are caused to play a soccer game on a real time basis in the virtual three-dimensional space constructed in the main memory 26.

Figure 3:
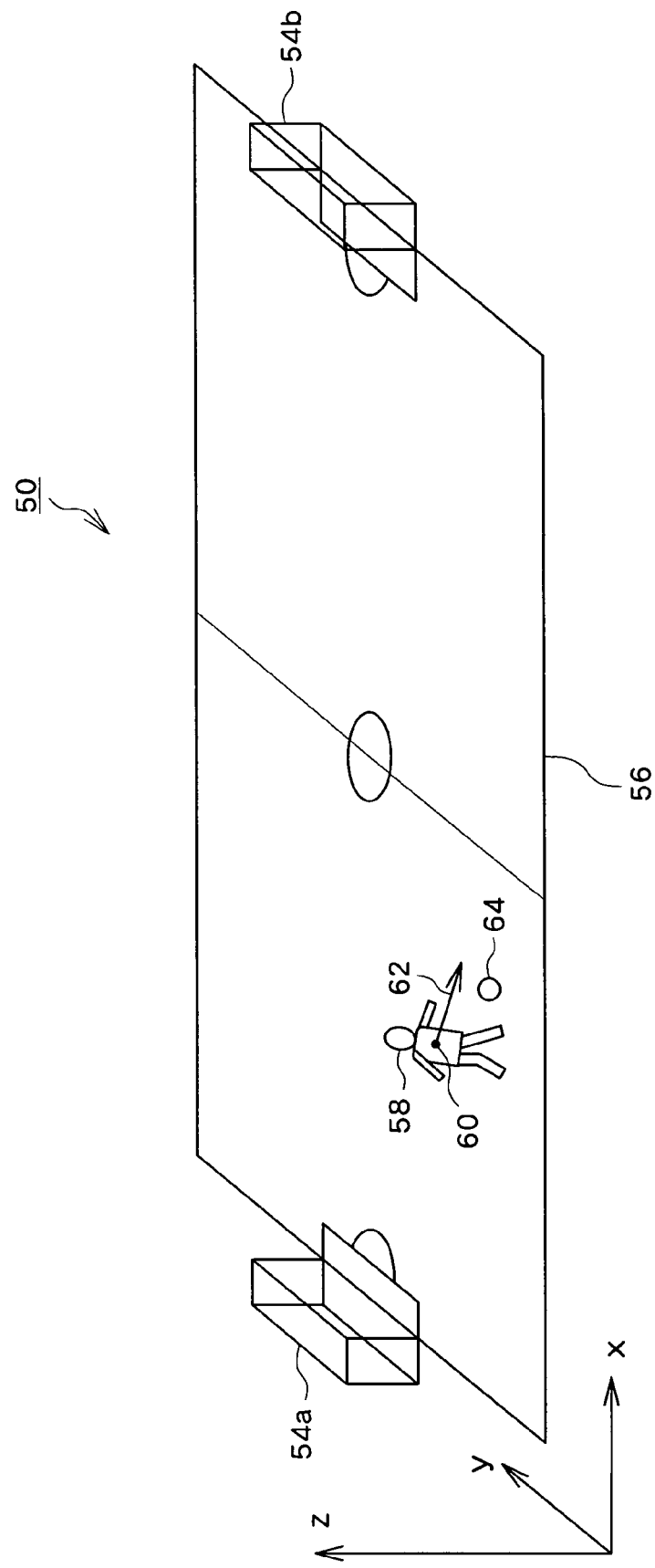
FIG. 3 is a perspective view showing an example three-dimensional space.

In the embodiment, a virtual three-dimensional space having a viewpoint and various objects disposed therein is constructed in the main memory 26, and a picture obtained by viewing the space from the viewpoint in a predetermined sight line direction is shown on the monitor 18. Here, as shown in FIG. 3, a virtual three-dimensional space 50 representing a soccer ground where a field object 56 and goal objects 54a, 54b are disposed is constructed in the main memory 26.

On the field object 56, a ball object 64 (a moving body object) representing a soccer ball (a moving body) and an operation target character object 58 (an operation target player character object) are disposed. The operation target character object 58 is a player character object to be operated by the controller 32, and makes various motions as operated by the controller 32. That is, the operation target character object 58 changes the position and posture thereof in the virtual three-dimensional space 50 according to an operation signal input from the controller 32.

A plurality of other player character objects are also disposed on the field object 56, though not shown in the drawings. These player character objects belong to either a player team, or a team to be operated by the game player, or an opponent team, or a team opponent of the player team. In the following, player character objects (except the operation target character object 58) belonging to the player team are referred to as teammate character objects, while player character objects belonging to the opponent team are referred to as opponent character objects (opponent player character objects). The positions and postures of these player character objects on the field object 56 vary according to a predetermined algorithm, whereby the player character objects play soccer. It should be noted that the goal objects 54a, 54b also belong to the player or opponent team, similar to the player character objects.

When the operation target character object 58 moves closer to the ball object 64 as so operated via the controller 32, the operation target character object 58 is caused to be associated with the ball object 64 under a predetermined condition. With the association, the ball object 64 moves following the operation target character object 58. This is shown on the monitor 18 as an image of the operation target character object 58 dribbling. While the operation target character object 58 remains associated with the ball object 64, it is possible to control via the controller 32 such that the operation target character object 58 kicks the ball object 64. That is, it is possible to control the operation target character object 58 so as to pass or shoot the ball object 64.

When a player character object moves closer to another player character object (including the operation target character object 58) associated with the ball object 64, the ball object 64 is taken by under a predetermined condition and caused to be associated with that approaching player character object.

After such competition for the ball object 64 by the player character objects and when the ball object 64 enters the goal object 54a or 54b associated with either team, the other team scores a goal.

Suppose that a teammate character object passes the ball object 64 to the operation target character object 58, for example, such that the ball object 68 approaches the operation target character object 58 from substantially ahead thereof. In this case, with designation made at a predetermined time of a direction substantially identical to the direction ahead of the ball object 64, the operation target character object 58 selectively causes either one of two kinds of motion according to the moving speed of the ball object 64.

That is, with the ball object 64 moving faster than a predetermined speed, the operation target character object 58 attempts to slow the moving ball object 64 by, for example, changing the trajectory of the moving ball object 64, reducing the moving speed of the ball object 64 (a trap motion), and so forth, while simultaneously turning its body towards the designated direction (a turn motion), before moving again in that direction while dribbling. These series of motions are realized using the motion data 2 to be described later.

Meanwhile, with the ball object 64 moving slower than a predetermined speed, the operation target character object 58 turns its body without a "trap motion" before moving in that direction. These series of motions are realized using the motion data 1 to be described later. In this case, when the operation target character object 58 catches up with the ball object 64, the operation target character object 58 begins dribbling. In this case, the game player controls the ball object 64 so as to keep moving at the current speed, without slowing the moving speed of the ball object 64, to thereby quickly attack by the operation target character object 58.

Figures 4, 5, 6:
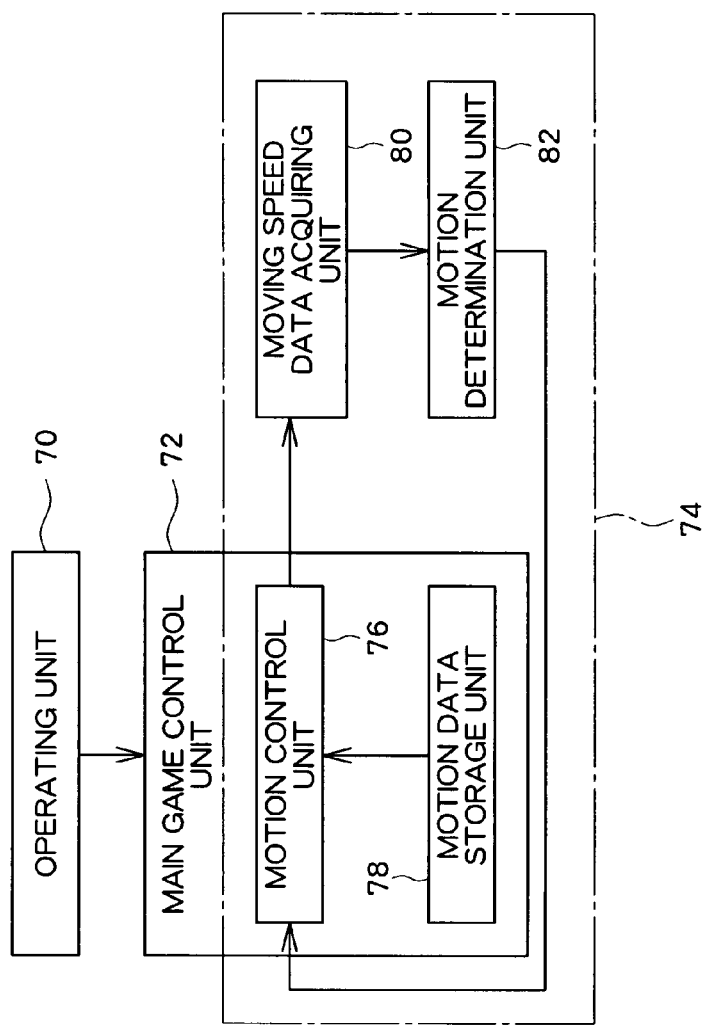
FIG. 4 is a diagram explaining the kind of motion data.
FIG. 5 is a diagram showing an example operation determination table.
FIG. 6 is a diagram showing functional blocks of the game device according to the embodiment.

Two kinds of motion data for the above-described two kinds of motion by the operation target character object 58 are stored in advance in the main memory 26. FIG. 4 shows the content of the two kinds of motion data.

FIG. 5 shows an example operation determination table stored in the main memory 26 of the game device 10. As shown, the operation determination table presents correspondence between the motion data and the speed range of the ball object 64. Specifically, the speed range A with the moving speed v of the ball object 64 equal to or larger than 0 and smaller than V1 is associated with motion data 1, while the speed range B with the moving speed v equal to or larger than V1 is associated with motion data 2, in which V1 is a constant indicative of a predetermined reference speed. V1 may be determined based on the movable speed parameter of the operation target character object 58, for example, substantially equal to the speed at which the operation target character object 58 can move.

In the following, functional structures of the game device 10 will be described. FIG. 6 is a functional block diagram of the game device 10. As shown, the game device 10 comprises, in terms of functions, an operating unit 70, a main game control unit 72, a moving speed data acquiring unit 80, and a motion determination unit 82. The main game control unit 72 includes a motion control unit 76 and a motion data storage unit 78.

The moving speed data acquiring unit 80, the motion determination unit 82, the motion control unit 76, and the motion data storage unit 78 together constitute an object control unit 74. The object control unit 74 controls the operation target character object 58 so as to change the position and posture thereof according to the moving speed of the ball object 64 in the virtual three-dimensional space 50.

The operating unit 70, which comprises a controller 32, is used to input an operation signal, via the direction button 34, specifying a moving direction of the operation target character object 58, an operation signal specifying a dash motion, and an operation signal specifying a motion, such as shooting etc., involving the ball object 64.

The main game control unit 72 creates the virtual three-dimensional space 50 in the main memory 26. In the virtual three-dimensional space 50, many objects, including the field object 56, the goal objects 54a, 54b, the ball object 64, the operation target character object 58, the teammate character objects, and the opponent character objects, are disposed.

Further, a viewpoint and a sight line direction are defined in the virtual three-dimensional space 50.

The main game control unit 72 stores information about the positions and postures of the ball object 64, the operation target character object 58, the teammate character objects, and the opponent character objects. For example, the coordinates of the representative position of each object are stored as the position of the object. In connection with the movement of the objects, the main game control unit 72 stores information about the orbit, the initial speed, the time having elapsed after the movement begins, the current moving direction, the current moving speed, and so forth. The content stored in the main game control unit 72 is updated for every predetermined period of time (for example, 1/60 second). For example, the position, posture, and so forth, of the operation target character object 58 are updated according to an operation signal input via the operating unit 70. As described above, the main game control unit 72 updates the situation in the virtual three-dimensional space 50 on a real time basis.

The main game control unit 72 updates the viewpoint position and the sight line direction for every predetermined period of time (for example, $1/60^{th}$ of a second). The main game control unit 72 produces a game image showing a picture obtained by viewing the virtual three-dimensional space from the viewpoint in the sight line direction for every predetermined period of time (for example, 1/60 second), and displays the game image on the monitor 18.

According to an instruction from the motion control unit 76 contained in the main game control unit 72, the moving speed data acquiring unit 80 finds moving speed data indicating the moving speed of the moving ball obtains 64 in the virtual three-dimensional space 50. For example, the moving speed data acquiring unit 80 obtains moving speed data indicative of the current moving speed of the ball object 64. For example, the moving speed of the ball object 64 when getting close to the operation target character object 58 is estimated, and moving speed data indicative of the estimated speed is obtained, as will be described in detail later (see S109 in FIG. 8).

The motion determination unit 82 determines to which of the speed ranges the moving speed indicated by the moving speed data obtained by the moving speed data acquiring unit 80 belongs. Specifically, the motion determination unit 82, which stores the operation determination table, shown in FIG. 5, determines to which of the two speed ranges A and B the moving speed indicated by the moving speed data belongs, and informs the motion control unit 76 of the motion data corresponding to the speed range determined.

The motion data storage unit 78 mainly comprises the main memory 26, the DVD-ROM 25, and so forth, for example, and stores motion data 1 and 2 of the operation target character object 58.

The motion control unit 76 controls the motion of the operation target character object 58. Specifically, the motion control unit 76 reads motion data informed by the motion determination unit 82 from the motion data storage unit 78, and based on the read motion data, changes the position, posture, and so forth, of the operation target character object 58 in the virtual three-dimensional space 50.

Figure 7:
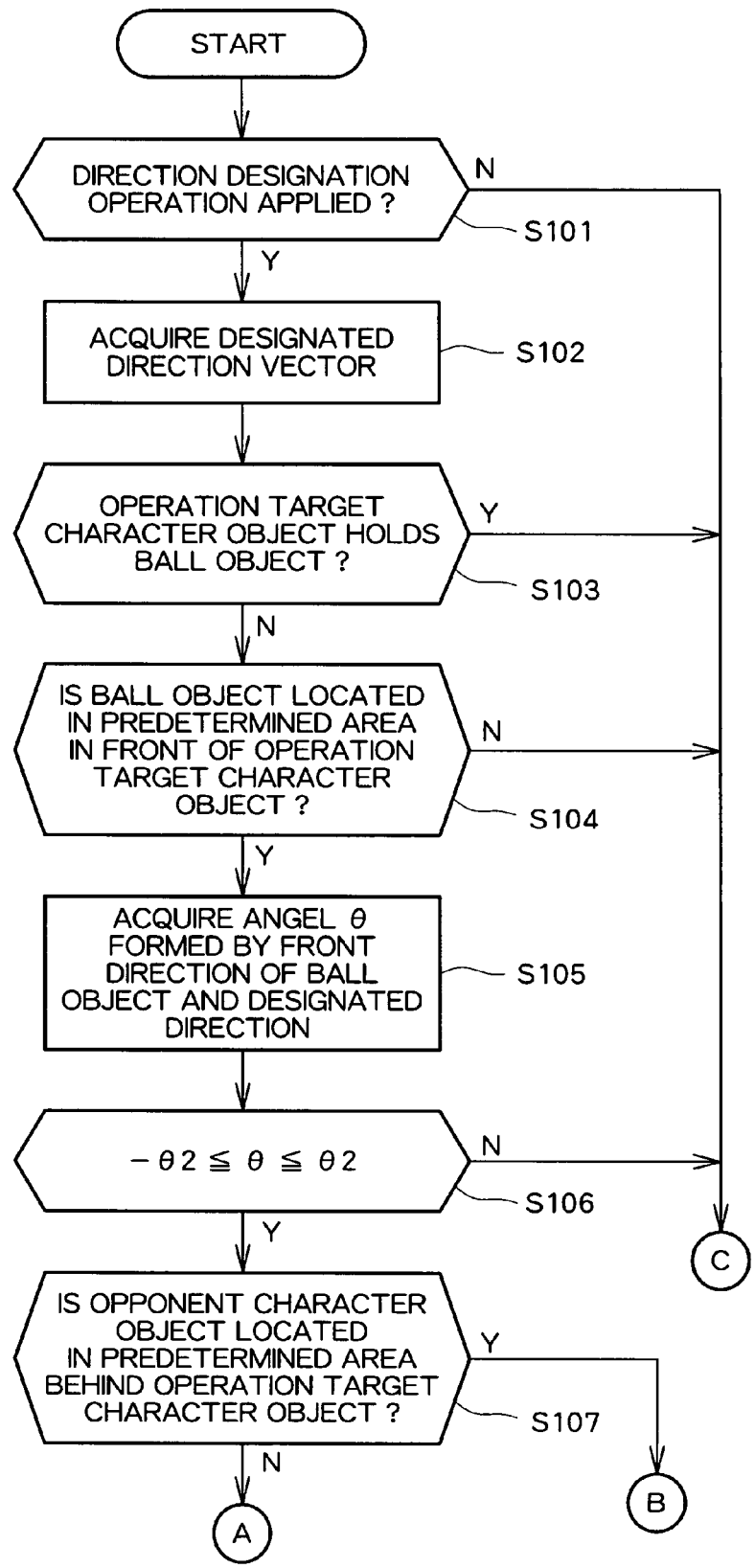
FIG. 7 is a flowchart of a process carried out by the game device.
Figure 8:
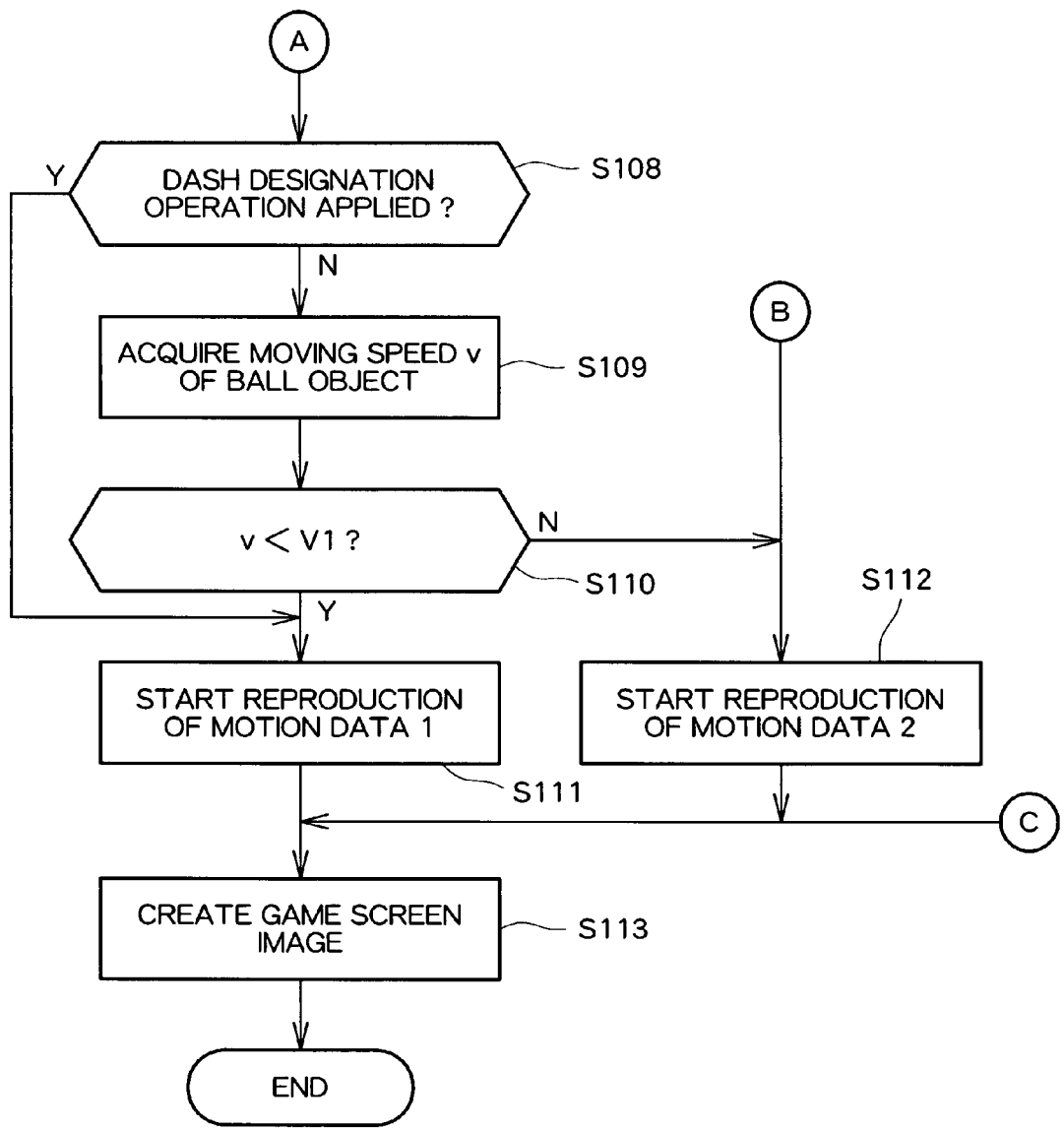
FIG. 8 is a flowchart of a process carried out by the game device.

In the following, a process carried out mainly by the object control unit 74 will be described in detail. FIGS. 7 and 8 show a flowchart of a process carried out mainly by the object control unit 74, among those carried out in the game device 10 for every predetermined period of time (for example, 1/60 second). The shown process is realized by the microprocessor 14 executing a game program stored in the DVD-ROM 25.

As shown in FIG. 7, initially, the object control unit 74 determines whether or not the game player carries out a direction designation operation (S101) Specifically, the object control unit 74 determines whether or not an operation signal (a predetermined operation signal) corresponding to a direction designation operation is input via the operating unit 70. In more detail, whether or not the direction button 34 is operated is determined based on the operation signal input from the operating unit 70.

When it is determined that the direction designation operation is carried out, the object control unit 74 obtains a designated direction vector (S102). Specifically, the object control unit 74 obtains the content of the direction designation operation based on the operation signal input from the operating unit 70. That is, the object control unit 74 obtains the content of the operation applied to the direction button 34, and obtains a designated direction vector (designated direction data) indicative of the direction corresponding to the operation content in the virtual three-dimensional space 50.

Thereafter, the object control unit 74 determines whether or not the operation target character object 58 holds the ball object 64 (S103). As information indicating whether or not the ball object 64 is associated with any player character object is held in the main game control unit 72, the object control unit 74 makes this determination based on the latest content stored in the main game control unit 72.

When it is determined that the operation target character object 58 holds the ball object 64, the motion control unit 76 updates the position of the operation target character object 58 to a "position having moved from the current position of the operation target character object 58 in the direction indicated by the moving direction vector obtained at step S102 by a predetermined amount". The object control unit 74 similarly updates the position of the ball object 64. The motion control unit 76 updates the posture of the operation target character object 58 based on the motion data specifying dribble motion.

Figure 9:
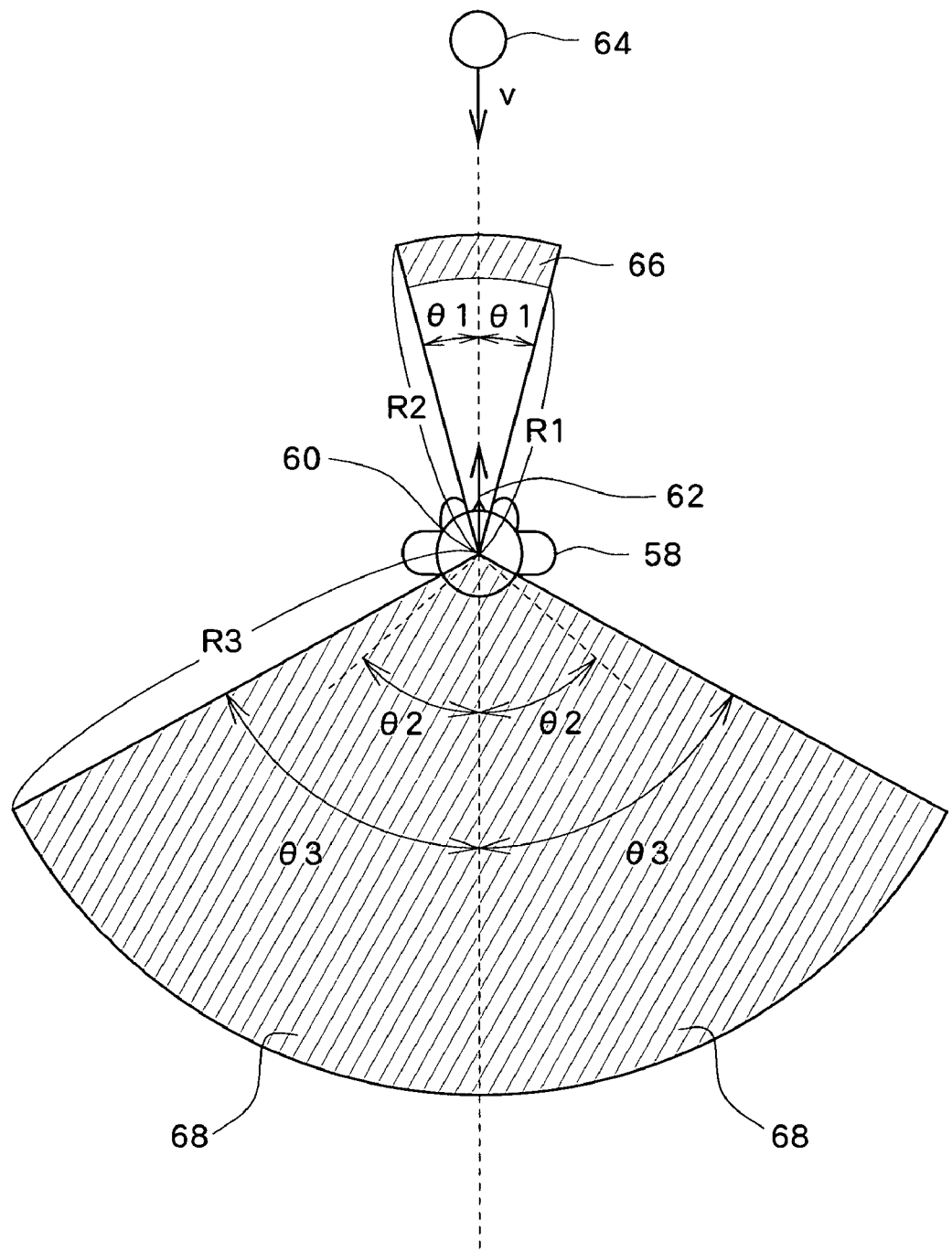
FIG. 9 is a diagram concerning control of a motion of an operation target character object.

Meanwhile, when it is determined that the operation target character object 58 does not hold the ball object 64, the main game control unit 72 (a position condition determination means) determines whether or not the position of the operation target character object 58 and that of the ball object 64 satisfy a predetermined position condition. Specifically, whether or not the ball object 64 is located within a predetermined range in the front direction 62 of the operation target character object 58 (S104). In this embodiment, for example, it is determined whether or not the central point of the ball object 64 is contained in the first focused area 66 defined between a line away by the distance R1 and a line away by the distance R2 from the position (more specifically, the representative position 60) of the operation target character object 58 and having an angular difference equal to or smaller than $\theta 1$ relative to the front direction 62 of the operation target character object 58, as shown in FIG. 9. In the above, the position coordinates of the operation target character object 58 (the representative position 60) and those of the central point of the ball object 64 are read from the main game control unit 72. It should be noted that $\theta 1$ may be a predetermined constant satisfying $0<\theta 1<\pi/2$. R1 and R2 may be determined, for example, based on a distance by which the ball object 64 can move during a predetermined period of time (for example, ⅛ second). For example, R1 may be a value obtained by subtracting a predetermined amount from the distance, while R2 may be a value obtained by adding a predetermined amount to the distance.

When it is determined that the ball object 64 is not located within the first focused area 66, the motion control unit 76 updates the position of the operation target character object 58 to a "position moved from the current position of the operation target character object 58 in the direction indicated by the designated direction vector obtained at step S102 by a predetermined amount". Further, the posture of the operation target character object 58 is updated based on the motion data specifying a running motion.

Meanwhile, when it is determined that the ball object 64 is located within the first focused area 66, the object control unit 74 obtains the angle $\theta$ formed by the direction ahead of the ball object 64 and the designated direction indicated by the designated direction vector obtained at step S102 (S105). In the above, the data indicating the direction ahead of the ball object 64 (moving direction data) is read from the main game control unit 72. The object control unit 74 (angle condition determination means) determines whether or not the angle $\theta$ satisfies a predetermined angle condition. In this embodiment, it is determined whether or not the angle $\theta$ is between $-\theta 2$ and $\theta 2$ (S106). It should be noted that $\theta 2$ is a predetermined constant satisfying $0<\theta 2<\pi/2$, and set at $\pi/4$, for example.

When it is determined that the angle $\theta$ obtained at step S105 is not between $-\theta 2$ and $\theta 2$, the motion control unit 76 updates the position of the operation target character object 58 to a "position having moved from the current position of the operation target character object 58 in the direction indicated by the designated direction vector obtained at step S102 by a predetermined amount". Further, the posture of the operation target character object 58 is updated based on the motion data specifying running motion.

Meanwhile, when it is determined that the angle $\theta$ obtained at S105 is between $-\theta 2$ and $\theta 2$, the object control unit 74 determines whether or not the opponent character object is located within a predetermined range on the back side of the operation target character object 58, based on the position of the operation target character object 58 and the direction ahead of the ball object 64 (S107). Specifically, it is determined whether or not the coordinates of the central position of the opponent character object are contained in the second focused area 68 within a distance equal to or smaller than R3 from the position (more specifically, the representative position 60) of the operation target character object 58, having an angular difference equal to or smaller than $\theta 3$ relative to the ahead direction of the ball object 64 (or the rear direction of the operation target character object 58). In the above, the position coordinates of the operation target character object 58 and those of each opponent character object are read from the main game control unit 72. It should be noted that R3 may be a predetermined constant or dynamically determined based on the movable speed of the operation target character object 58.

When it is determined that no opponent character object is located within the second focused area 68, the object control unit 74 determines whether or not the game player applies a dash designation operation, based on the operation signal input from the operating unit 70 (S108). Here, the dash designation operation is an operation for instructing the operation target character object 58 to move faster than usual. Suppose that the dash designation operation is made by pressing the button 42R. In this case, the object control unit 74 determines whether or not an operation signal indicative of the button 42R being pressed is input from the operating unit 70.

When it is determined that no dash designation operation is applied, the motion control unit 76 controls the moving speed data acquiring unit 80 so as to find out the moving speed v (moving speed data) of the ball object 64 (S109). In this case, the moving speed data acquiring unit 80 reads data about the movement of the ball object 64 from the main game control unit 72, and estimates, based on the read data, the speed v of the ball object 64 when moving to the operation target character object 58 (in further detail, in an area within a predetermined distance from the representative position 60).

Thereafter, the motion determination unit 82 determines whether or not the moving speed v found out at step S109 is smaller than a reference speed V1 (S110), with V1 being a predetermined constant. It should be noted that V1 may be dynamically determined based on the movable speed of the operation target character object 58. That is, the speed range corresponding to each item of motion data may be dynamically determined.

When it is determined that the moving speed v is smaller than V1, the motion control unit 76 reads motion data 1 corresponding to the speed range A (motion data for a turn motion without a trap motion) from the motion data storage unit 78, and begins reproduction of the read motion data 1 (S111). That is, update of the position and posture of the operation target character object 58 based on the motion data 1 begins, and the operation target character object 58 is caused to begin a "turn motion without a trap motion".

When it is determined at S108 that dash designation operation is applied, the process at S111 is carried out. That is, when the operation target character object 58 moves faster than usual, even when the moving speed v of the ball object 64 is equal to or larger than V1, the operation target character object 58 makes a motion (a turn motion without a trap motion) specified by the motion data 1. Therefore, the game player can control the operation target character object 58 so as to make a motion which is generally made when the moving speed v is smaller than V1, by applying the direction designation operation and the dash designation operation.

Meanwhile, when it is determined that the moving speed v is equal to or larger than V1, the motion control unit 76 reads motion data 2 (motion data for a turn motion with a trap motion) corresponding to the speed range B from the motion data storage unit 78, and begins reproduction of the motion data 2 (S112). That is, update of the position and posture of the operation target character object 58 based on the motion data 2 begins, to thereby cause the operation target character object 58 to begin a "turn motion with a trap motion".

In this case (that is, the moving speed v belongs to the speed range B (a specific speed range)), the operation target character object 58 is controlled so as to make a trap motion. As a result, a process to damp the movement of the ball object 64 is carried out. Specifically, a process to change the trajectory of the ball object 64 or a process to reduce the moving speed of the ball object 64 is applied.

When it is determined at step S107 that at least one opponent character object is located within the second focused area 68, the process at the above-described step is carried out. That is, when it is determined that at least one opponent character object is located within the second focused area 68, the operation target character object 58 makes a motion (a turn motion with a trap motion) specified by the motion data 2 irrespective of the moving speed of the ball object 64. With the opponent character object located within the second focused area 68, the ball object 64 is highly likely to be lost unless the operation target character object 58 makes a trap motion. However, in this embodiment, as it is possible to control the trajectory, moving speed, or the like, of the ball object 64 by controlling the operation target character object 58 so as to make a trap motion, the ball object 64 can be prevented from being lost.

As the operation target character object 58 is controlled so as to make a trap motion even in this case (that is, when it is determined that an opponent character object is located within the second focused area 68), a process to suppress the movement of the ball object 64 is carried out. Specifically, a process to change the trajectory of the ball object 64, a process to reduce the moving speed of the ball object 64, and so forth, are applied.

The main game control unit 72 determines the viewpoint position and the sight line direction, and creates, in the VRAM, a game screen image showing the picture obtained by viewing the virtual three-dimensional space 50 from the viewpoint in the sight line direction (S113). The game screen image rendered in the VRAM is output to the monitor 18 at a predetermined timing.

As described above, according to the game device 10, when a predetermined direction designation operation (an operation to designate a direction substantially identical to the ahead direction of the ball object 64) is applied at a predetermined time (with the ball object 64 located within the first focused area 66) while the ball object 64 is moving towards the operation target character object 58, the operation target character object 58 makes a motion in accordance with the moving speed of the ball object 64. That is, the game player can relatively readily cause the operation target character object 58 to make a motion in accordance with the moving speed of the ball object 64. Therefore, according to the present invention, operability of a soccer game can be enhanced, with the enjoyability thereof being improved.

It should be noted that the present invention is not limited to the above-described embodiment.

For example, the present invention is applicable not only to a soccer game, but also to various other ball sports games, including a basketball game, or the like. Moreover, the present invention is applicable not only to a ball sport game, but also to a sports game using a moving body, such as an ice hockey game using a puck (a moving body), or the like.

Figure 10:
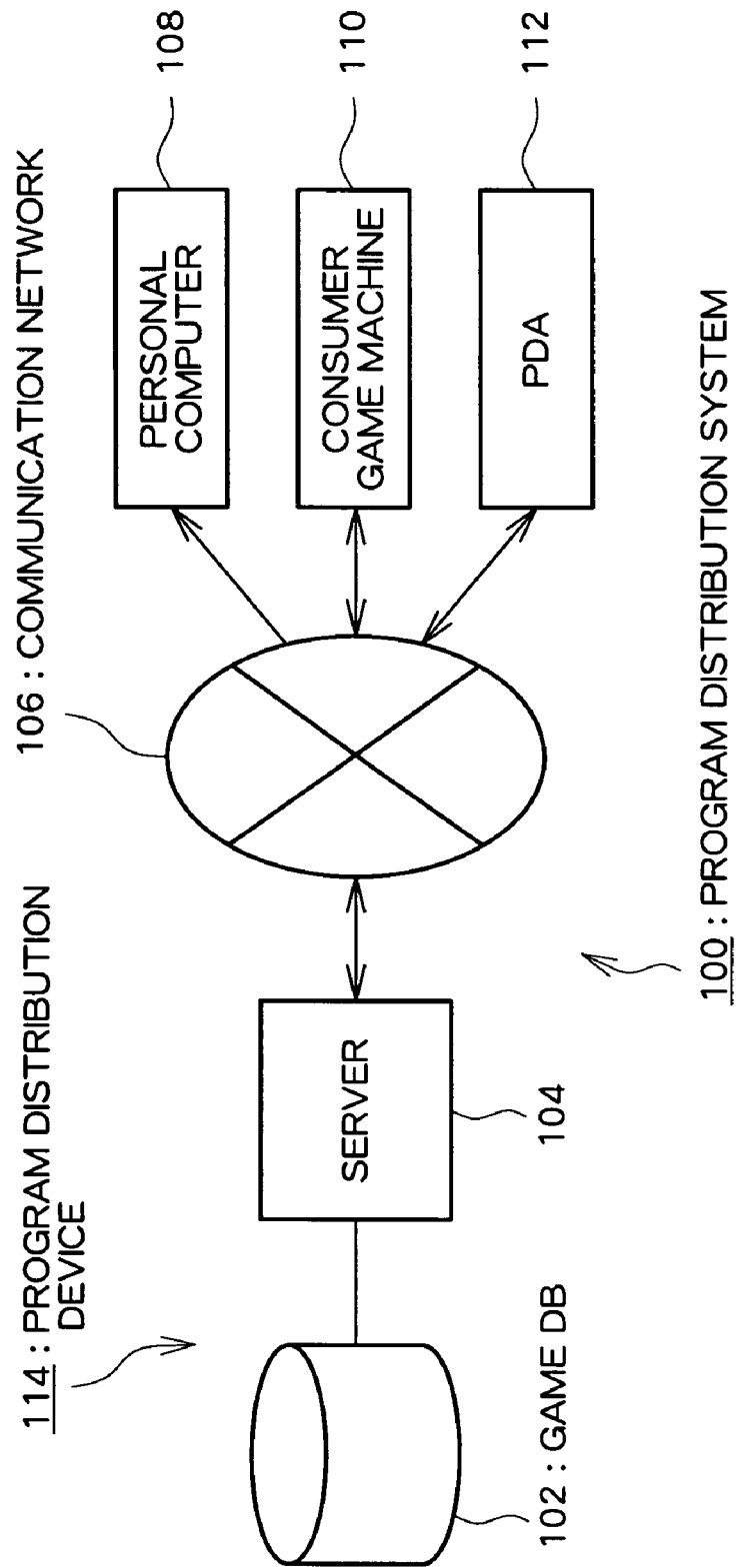
FIG. 10 is a diagram showing an overall structure of a program distribution system according to another embodiment of the present invention.

Although it is described in the above that a program is supplied from a DVD-ROM 25, or an information storage medium, to the consumer game machine 11, alternatively, the program may be distributed via a communication network to a home, or the like. FIG. 10 is a diagram showing an overall structure of a program distribution system using a communication network. Based on FIG. 10, a program distribution method according to the present invention will be described.

As shown, the program distribution system 100 comprises a game database 102, a server 104, a communication network 106, a personal computer 108, a consumer game machine 110, and a PDA (personal digital assistant) 112. Among those structural elements, the game database 102 and the server 104 together constitute a program distribution device 114. The communication network 106 comprises, for example, the Internet, a cable television network, or the like. In this system, a program identical to the content stored in the DVD-ROM 25 is stored in the game database (an information storage medium) 102. When a person in need of a game requests game distribution via the personal computer 108, the consumer game machine 110, the PDA 112, or the like, the request is transmitted via the communication network 106 to the server 104. Then, the server 104, in response to the game distribution request, reads the program from the game database 102, and sends the read program to the entity having requested the game distribution, such as the personal computer 108, the consumer game machine 110, the PDA 112, or the like. In the above, a game is distributed in response to a game distribution request. Alternatively, the server 104 may unidirectionally sends a game. Further, all components of the program necessary to realize a game are not necessarily sent at once (collective distribution), and only a necessary component of the program according to an aspect of the game may be sent (dividing distribution). With a game distributed via a communication network 106 as described, a person in need of the program can readily obtain the program.

The invention claimed is:

1. A game device for displaying an image obtained by viewing, from a predetermined viewpoint, a virtual three-dimensional space where an operation target player character object which changes a position and posture thereof according to an operation signal and a moving body object representative of a moving body are disposed, and providing a sports game using the moving body, the game device the game machine comprising a processor which runs a program capable of performing the functions of:

determining whether or not a position of the operation target player character object and a position of the moving body object in the virtual three-dimensional space satisfy a predetermined position condition comprising whether or not a distance between the moving body object and the operation target player character object is equal to or larger than R1 and equal to or smaller than R2 and whether or not an angle formed by a direction from the operation target player character object to the moving body object and a front direction of the operation target player character object is equal to or smaller than θ1, wherein R1 and R2 are predetermined constants and θ1 is a predetermined constant satisfying $0<\theta 1<\pi/2$;

determining whether or not an angle formed by a direction corresponding to a direction designation operation in the virtual three-dimensional space and a moving direction of the moving body object in the virtual three-dimensional space satisfy a predetermined angle condition between $-\theta 2$ and $\theta 2$, wherein θ2 is a predetermined constant satisfying $0<\theta 2<\pi/2$; and controlling the position and posture of the operation target player character object in the virtual three-dimensional space in accordance with a moving speed of the moving body object in the virtual three-dimensional space, when the determining the position condition comprises determining that the predetermined position condition is satisfied and the determining the angle condition determines that the predetermined angle condition is satisfied, wherein the controlling comprises, when a first speed range of a speed of the moving body object is slower than a predetermined reference speed, changing the position and posture of the operation target player character object by first motion data that causes the operation target player character object to turn without changing the speed of the moving body object, and when a second speed range of the speed of the moving body object is equal to or faster than the predetermined speed, changing the position and the posture of the operation target player character object by second motion data that causes the operation target player character to turn while changing the speed of the moving body object.

2. The game device according to claim 1, wherein the controlling includes determining to which of the first speed range and the second speed range the moving speed of the moving body object in the virtual three-dimensional space belongs, storing the first motion data and the second motion data about the operation target player character object in association with the first speed range and the second speed range, and the changing the position and posture of the operation target player character object.

3. The game device according to claim 2, wherein the controlling further includes changing a trajectory of the moving body object in the virtual three-dimensional space, when the moving speed of the moving body object in the virtual three-dimensional space belongs to a specific speed range.

4. The game device according to claim 2, wherein the controlling includes causing the operation target player character object to change position and posture thereof in the virtual three-dimensional space according to the first motion data, when the moving speed of the moving body object in the virtual three-dimensional space belongs to the first speed range and the moving body object is located within the predetermined distance from the front direction of the operation target player character object and the angle satisfies the predetermined angle condition between $-\theta 2$ and $\theta 2$, to thereby cause the operation target player character object to turn in a direction corresponding to the direction designation operation in the virtual three-dimensional space based on an input from a controller operated by a user of the game device, without changing the speed of the moving body object, and causing the operation target player character object to change position and posture thereof in the virtual three-dimensional space according to the second motion data, when the moving speed of the moving body object in the virtual three-dimensional space belongs to the second speed range and the moving body object is located within the predetermined distance from the front direction of the operation target player character object and the angle satisfies the predetermined angle condition between $-\theta 2$ and $\theta 2$, to thereby cause the operation target player character object to turn in a direction corresponding to the direction designation operation in the virtual three-dimensional space based on an input from a controller operated by a user of the game device, while changing the speed of the moving body object.

5. The game device according to claim 1, wherein the controlling includes:

determining whether or not at least one opponent player character object which opposes the operation target player character object is located in a focused area in the virtual three-dimensional space based on a position of the operation target player character object and a moving direction of the moving body object, and changing the speed of the moving body object in the virtual three-dimensional space, when it is determined that the at least one opponent player character object is located in the focused area.

6. The game device according to any one of claims 1 to 5, wherein the game is a ball sport game, and the moving body object is a ball object.

7. A method for controlling a game device for displaying an image obtained by viewing, from a predetermined viewpoint, a virtual three-dimensional space where an operation target player character object which changes a position and posture thereof according to an operation signal and a moving body object representative of a moving body are disposed, and providing a sports game using the moving body, the method comprising:

a position condition determination step of determining in a processor whether or not a position of the operation target player character object and a position of the moving body object in the virtual three-dimensional space satisfy a predetermined position condition comprising whether or not a distance between the moving body object and the operation target player character object is equal to or larger than R1 and equal to or smaller than R2 and whether or not an angle formed by a direction from the operation target player character object to the moving body object and a front direction of the operation target player character object is equal to or smaller than $\theta 1$, wherein R1 and R2 are predetermined constants and $\theta 1$ is a predetermined constant satisfying $0<\theta 1<\pi/2$;

an angle condition determination step of determining in the processor whether or not an angle formed by a direction corresponding to a direction designation operation in the virtual three-dimensional space and a moving direction of the moving body object in the virtual three-dimensional satisfy a predetermined angle condition between $-\theta 2$ and $\theta 2$, wherein $\theta 2$ is a predetermined constant satisfying $0<\theta 2<\pi/2$; and an object control step of controlling in the processor the position and posture of the operation target player character object in the virtual three-dimensional space in accordance with a moving speed of the moving body object in the virtual three-dimensional space, when it is determined at the position condition determination step that the predetermined position condition is satisfied, and it is determined at the angle condition determination step that the predetermined angle condition is satisfied, wherein the controlling in the processor comprises,
  when a first speed range of a speed of the moving body object is slower than a predetermined reference speed, changing the position and posture of the operation target player character object by first motion data that causes the operation target player character object to turn without changing the speed of the moving body object, and
  when a second speed range is equal to or faster than the predetermined speed, changing the position and posture of the operation target player character object by second motion data that causes the operation target player character to turn while changing the speed of the moving body object.

8. A non-transitory computer readable information storage medium game device storing a program for causing a computer to function as a game device providing a sports game of using the moving body, and also to function as:
  means for displaying an image obtained by viewing, from a predetermined viewpoint, a virtual three-dimensional space where an operation target player character object which changes a position and posture thereof according to an operation signal and a moving body object representative of a moving body are disposed;
  means for determining whether or not a position of the operation target player character object and a position of the moving body object in the virtual three-dimensional space satisfy a predetermined position condition comprising whether or not a distance between the moving body object and the operation target player character object is equal to or larger than R1 and equal to or smaller than R2 and whether or not an angle formed by a direction from the operation target player character object to the moving body object and a front direction of the operation target player character object is equal to or smaller than $\theta 1$, wherein R1 and R2 are predetermined constants and $\theta 1$ is a predetermined constant satisfying $0<\theta 1<\pi/2$;
  means for determining whether or not an angle formed by a direction corresponding to a direction designation operation in the virtual three-dimensional space and a moving direction of the moving body object in the virtual three-dimensional satisfy a predetermined angle condition between $-\theta 2$ and $\theta 2$, wherein $\theta 2$ is a predetermined constant satisfying $0<\theta 2<\pi/2$; and
  means for controlling the position and posture of the operation target player character object in the virtual three-dimensional space in accordance with a moving speed of the moving body object in the virtual three-dimensional space, when the means for determining position condition determines that the predetermined position condition is satisfied and the means for determining angle condition determines that the predetermined angle condition is satisfied, wherein the controlling comprises,
    when a first speed range of a speed of the moving body object is slower than a predetermined reference speed, changing the position and posture of the operation target player character object by first motion data that causes the operation target player character object to turn without changing the speed of the moving body object, and
    when a second speed range is equal to or faster than the predetermined speed, changing the position and posture of the operation target player character object by second motion data that causes the operation target player character to turn while changing the speed of the moving body object.

9. The method of claim 7, wherein the controlling comprises:
  determining to which of the first speed range and the second speed range the moving speed of the moving body object in the virtual three-dimensional space belongs,
  storing the first motion data and the second motion data about the operation target player character object in association with the first speed range and the second speed range, and
  the changing the position and posture of the operation target player character object,
  and the controlling further includes,
    causing the operation target player character object to change position and posture thereof in the virtual three-dimensional space according to the first motion data, when the moving speed of the moving body object in the virtual three-dimensional space belongs to the first speed range and the moving body object is located within the predetermined distance from the front direction of the operation target player character and the angle satisfies the predetermined angle condition between $-\theta 2$ and $\theta 2$, to thereby cause the operation target player character object to turn in a direction corresponding to the direction designation operation in the virtual three-dimensional space based on an input from a controller operated by a user of the game device, without changing the speed of the moving body object, and
    causing the operation target player character object to change position and posture thereof in the virtual three-dimensional space according to the second motion data, when the moving speed of the moving body object in the virtual three-dimensional space belongs to the second speed range and the moving body object is located within the predetermined distance from the front direction of the operation target player character and the angle satisfies the predetermined angle condition between $-\theta 2$ and $\theta 2$, to thereby cause the operation target player character object to turn in a direction corresponding to the direction designation operation in the virtual three-dimensional space based on an input from a controller operated by a user of the game device, while changing the speed of the moving body object.

10. The non-transitory computer readable information storage medium game device of claim 8, wherein the means for controlling includes means for determining to which of the first speed range and the second speed range the moving speed of the moving body object in the virtual three-dimensional space belongs, means for storing the first motion data and the second motion data about the operation target player character object in association with the first speed range and the second speed range, and the means for changing the position and posture of the operation target player character object, and wherein the means for controlling further includes means for causing the operation target player character object to change position and posture thereof in the virtual three-dimensional space according to the first motion data, when the moving speed of the moving body object in the virtual three-dimensional space belongs to the first speed range and the moving body object is located within the predetermined distance from the front direction of the operation target player character object and the angle satisfies the predetermined angle condition between $-\theta 2$ and $\theta 2$, to thereby cause the operation target player character object to turn in a direction corresponding to the direction designation operation in the virtual three-dimensional space based on an input from a controller operated by a user of the game device, without changing the speed of the moving body object, and means for causing the operation target player character object to change position and posture thereof in the virtual three-dimensional space according to the second motion data, when the moving speed of the moving body object in the virtual three-dimensional space belongs to the second speed range and the moving body object is located within the predetermined distance from the front direction of the operation target player character object and the angle satisfies the predetermined angle condition between $-\theta 2$ and $\theta 2$, to thereby cause the operation target player character object to turn in a direction corresponding to the direction designation operation in the virtual three-dimensional space based on an input from a controller operated by a user of the game device, while changing the speed of the moving body object.

* * * * *